United States Patent Office 3,819,815
Patented June 25, 1974

3,819,815
SULFATE REMOVAL FROM MAGNESIUM CHLORIDE
Hung-Kei H. Lam, Walnut Creek, Calif., assignor to Kaiser Aluminum & Chemical Corporation, Oakland, Calif.
No Drawing. Filed Dec. 24, 1969, Ser. No. 888,038
Int. Cl. C01b 5/30
U.S. Cl. 423—498
9 Claims

ABSTRACT OF THE DISCLOSURE

Sulfate impurities in molten magnesium chloride may be rapidly and effectively removed with simultaneous production of magnesium oxide by dispersing finely divided carbon in the molten magnesium chloride phase. The resultant magnesium oxide may then be removed by allowing it to settle to the bottom of the molten bath and withdrawing purified magnesium chloride from the upper portion of the bath.

BACKGROUND

In the electrolytic production of magnesium from magnesium chloride, trace elements in the cell cause varying problems. For example, sulfates in the cell feed consumes magnesium metal, and magnesium sulfide and/or magnesium oxide are formed. Sulfur dioxide gas may also be generated in this process. As a result, sulfate impurities cannot be tolerated in the cell operation.

Therefore in preparing anhydrous $MgCl_2$ cell feed, one must start with brines containing no sulfate or the sulfates must be removed from solution by various elaborate means, such as fractional crystallization, chemical precipitation, etc. prior to obtaining the anhydrous $MgCl_2$. In the case of chlorination of magnesia to produce $MgCl_2$ cell feed, sulfate impurities in the raw materials would be much less critical since the sulfate would be removed in the chlorination step.

In utilizing the high sulfate bittern from Bonneville or from the Great Salt Lake area for $MgCl_2$ cell feed preparation, the bittern purification is fairly difficult. In the case of the Bonneville bittern, the sulfate may be as high as 2–3% in the brine containing about 30% $MgCl_2$. If this bittern were dehydrated to the anhydrous state and assuming an 80% overall $MgCl_2$ recovery, the sulfate content of the $MgCl_2$ bittern may be as high as 7.5–12%. This sulfate level is obviously too high for cell feed purposes. If the sulfate is removed as the $MgCl_2$ is concentrated to approximately 42%, the final anhydrous $MgCl_2$ product still contains about 1% sulfate. A satisfactory sulfate level of less than 0.05% can be achieved by concentrating the $MgCl_2$ to approximately 52% before filtering off the sulfate impurities. However, this treatment requires the filtration of a finely divided solid at about 330° F. which is very difficult to carry out and additional high loss of valuable $MgCl_2$ is incurred.

I have discovered a simple process for the sulfate removal without any of the aforementioned shortcomings and without the chlorine requirement as in the chlorination of magnesia.

DETAILED DISCLOSURE

I have discovered that the sulfate impurities in the magnesium chloride is rapidly and effectively removed if finely divided carbon is dispersed throughout the molten magnesium chloride. In calculating the stoichiometric reltionships set forth hereinafter, it was assumed that the reaction involved may be represented by the following equation:

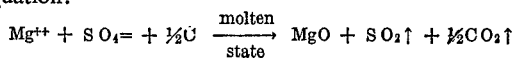

The sulfate impurities may be associated with cations from the alkali or alkaline earth families or from other metallic sulfates, especially those which are soluble in molten $MgCl_2$.

A stoichiometric amount of carbon may be added to convert sulfate to magnesium oxide in accordance with the formula set forth above. In general, however, an excess of the stoichiometric amount, e.g. up to 4 times, is preferred. Considerable excess carbon may be used but is not necessary. In fact, it may be necessary to remove residual carbon if the magnesium chloride is to be used in an electrolytic process. Less than the stoichiometric amount may be employed if it is not necessary to remove all the sulfate.

While various forms of carbon may be used to convert the sulfate in accordance with the present invention, finely divided activated carbon, ordinary charcoal, and lampblack have been found to be particularly effective. The temperature for carrying out the reaction should be above the melting point of magnesium chloride salt system in order to provide a molten bath, but the temperature should be below the boiling point of the salt systems. The temperature may be maintained at a temperature of about 750° C. to about 900° C. for at least 5 minutes.

Certain additional benefits have been noted in carrying out the experiments underlying the present invention. Nickel, iron, and boron impurities are reduced to some extent in carrying out the steps of this invention. Since these are all impurities which adversely effect the electrolytic production of magnesium and chlorine from magnesium chloride, the lower levels are desirable.

The following examples illustrate the present invention, wherein percentage compositions are by weight. They are not intended as limitations thereof since modifications will be apparent to those skilled in the art.

EXAMPLE 1

500 grams of essentially pure magnesium chloride containing 1.33% magnesium sulfate was melted in a Vycor beaker placed inside a 5 inch diameter Hoskins electric crucible furnace. After the magnesium chloride was completely melted, a decant sample was taken and approximately 3 grams of 20 mesh Gilsonite coke was dispersed throughout the melt. Gas was immediately evolved and a strong sulfur dioxide odor was noted. Within 15 minutes, the magnesium sulfate concentration had been reduced to 0.68%.

EXAMPLE 2

20 mesh Gilsonite coke in an amount approximately equal to 5.6 times the stoichiometric amount required to convert the sulfate present was added to molten magnesium chloride contaminated with lithium ion. The bath was maintained at a temperature from 865° to 880° for 2¼ hours. During this time, sulfate was reduced from 1.23 to 0.08%. The addition of three times the stoichiometric amount of activated carbon needed to complete the reaction reduced the sulfate concentration from 0.08% to 0.03% in another 1½ hours.

EXAMPLE 3

Activated carbon equal to four times the stoichiometric amount needed was added to molten magnesium chloride contaminated with $Li^+$, $K^+$ and $Na^+$ at a temperature of 850° C. Within one hour the sulfate level initially present had been reduced from 1.9% to 0. A slight reduction in the nickel level was also noted, dropping from 133 p.p.m. to 84 p.p.m. in one hour and to 60 after 4½ hours.

EXAMPLE 4

Ordinary charcoal equal to 1.6 times the stoichiometric amount required was added to molten magnesium chloride at a temperature of 850° C. The initial sulfate ion calculated as magnesium sulfate was 3.17%. At the end of ½ hour the magnesium sulfate concentration had been reduced to 0.04% and had been completely reduced at the end of 1 hour.

EXAMPLE 5

1.3 times the amount of furnace black stoichiometrically required for reaction with sulfate was added to molten magnesium chloride additionally contaminated with boron compounds at a temperature of 840° C. 4½ times the amount of lithium fluoride equivalent stoichiometrically to boron trifluoride was also added. The initial sulfate level of 2.69 had been completely converted after ½ hour. The boron level had been reduced from 420 p.p.m. to 350 p.p.m. in that time. The nickel level was reduced from 86 p.p.m. to 54 p.p.m. The iron level was reduced from 106 p.p.m. to 69 p.p.m.

What is claimed is:

1. A method for removing sulfate impurities from magnesium chloride which comprises adding to and dispersing finely divided carbon in molten magnesium chloride.

2. The method of claim 1 wherein the sulfate impurities are dissolved in said molten magnesium chloride.

3. The method of claim 1 wherein said molten magnesium chloride contains alkali metal ions.

4. The method of claim 1 wherein said molten magnesium chloride contains alkaline earth ions.

5. The method of claim 4 wherein the alkaline earth ions consist of magnesium ion.

6. The method of claim 2 wherein finely divided carbon is maintained from activated carbon, charcoal, or lampblack.

7. The process of claim 2 wherein the molten magnesium chloride and dispersed carbon were maintained at a temperature from about 750° C. to about 900° C. for at least 5 minutes.

8. The process of claim 1 wherein magnesium oxide produced by the reaction of carbon, magnesium ion and sulfate is allowed to settle in the bath and substantially pure molten magnesium chloride is removed from the upper portion of the bath.

9. The process of claim 6 wherein the carbon is added in excess of the stoichiometric amount needed to react with all the sulfate present.

References Cited
UNITED STATES PATENTS 3,484,191  12/1969  Lyons _____ 23—91
3,512,928  5/1970   Lyons et al. _____ 23—91

EDWARD STERN, Primary Examiner